Figure 2:
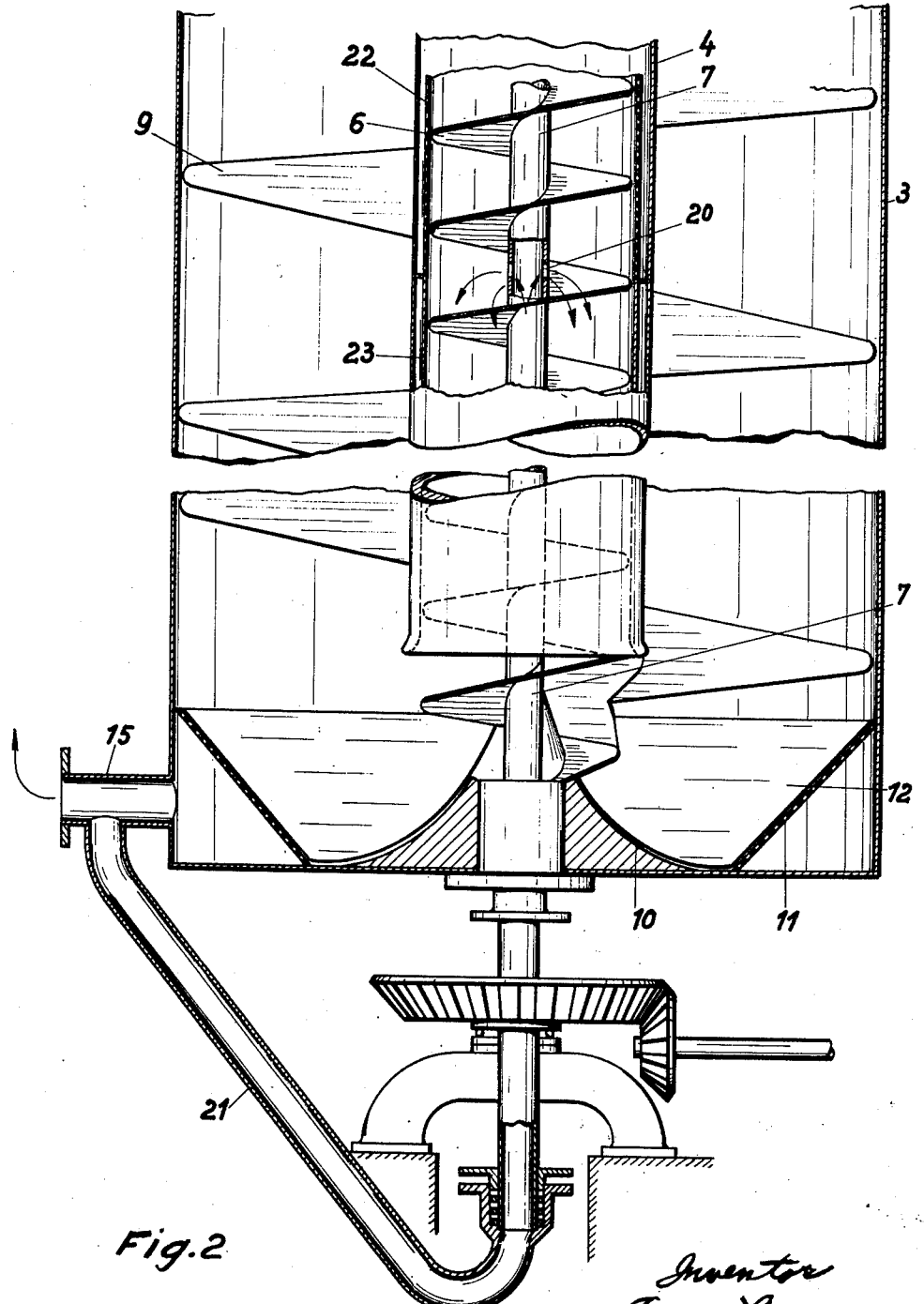

May 5, 1953  
E. LANGEN  
2,637,666  
EXTRACTION TOWER FOR COMMINUTED MATERIAL OF VEGETABLE  
OR PLANT ORIGIN, PARTICULARLY SUGAR BEETS  
Filed Jan. 31, 1950  
6 Sheets-Sheet 1
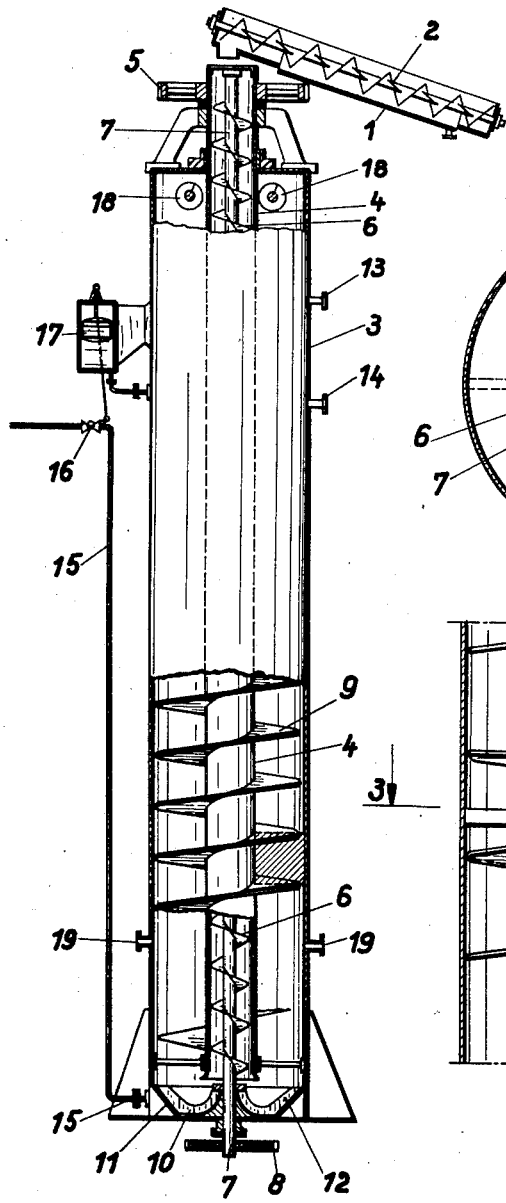
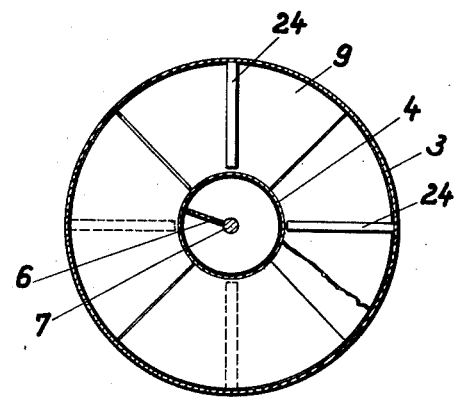
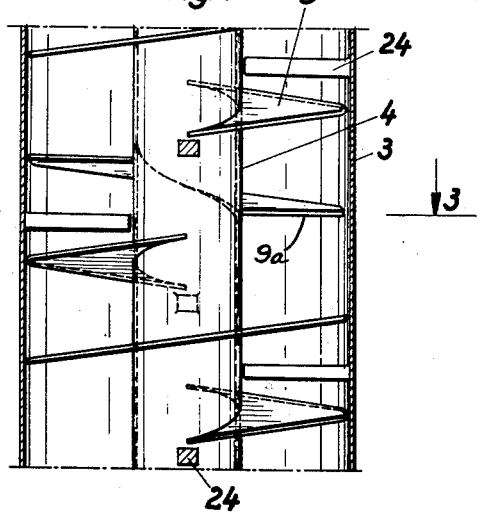
Inventor  
Eugen Langen  
By Frank W. Dahn  
Attorneys

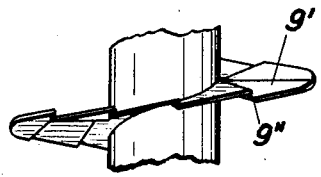
Fig. 5
Fig. 6
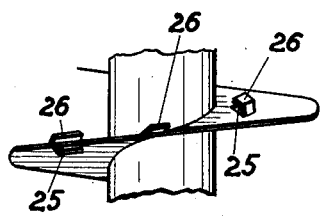
Fig. 7
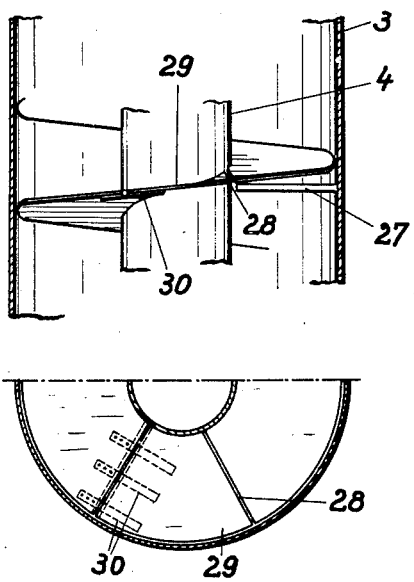

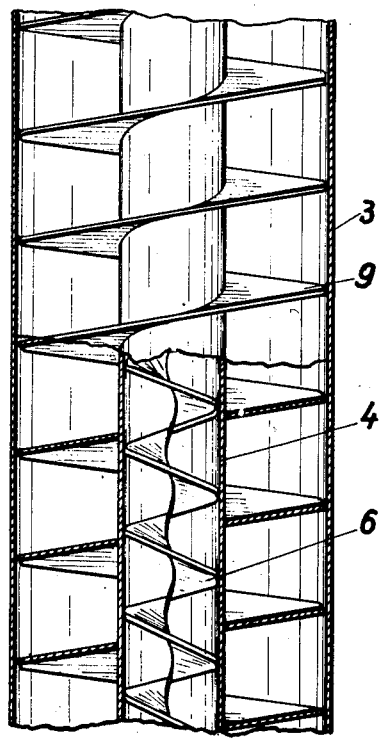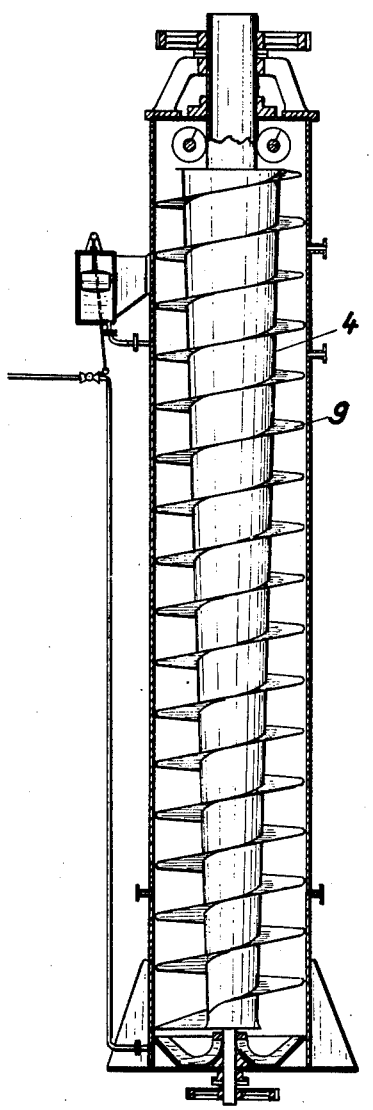

May 5, 1953  E. LANGEN  2,637,666
EXTRACTION TOWER FOR COMMINUTED MATERIAL OF VEGETABLE
OR PLANT ORIGIN, PARTICULARLY SUGAR BEETS
Filed Jan. 31, 1950  6 Sheets-Sheet 5
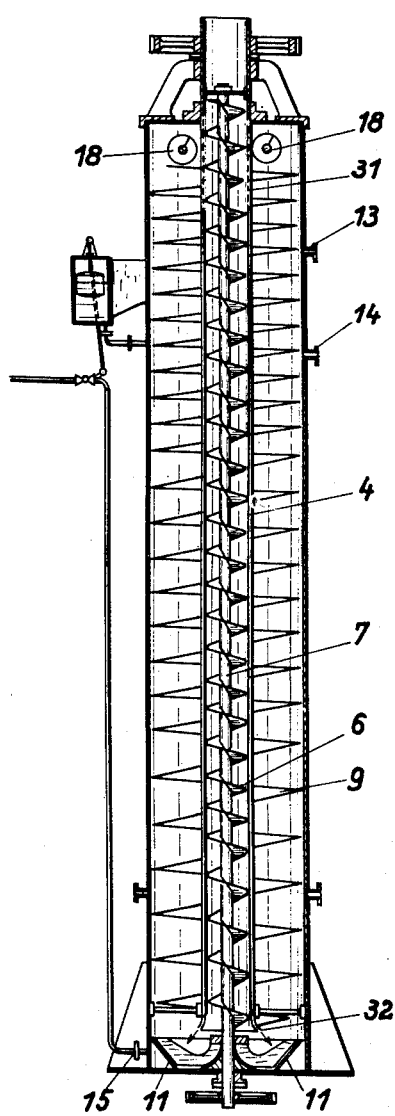
Fig.9.
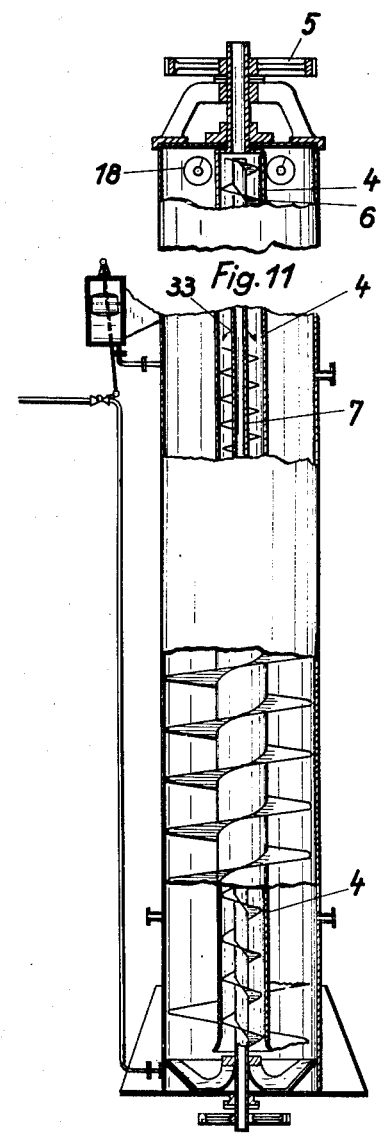
Fig.10
Fig.11
Inventor
Eugen Langen
By Frank W. Dahn
attorney.

Fig. 13
Fig. 14
Fig. 15
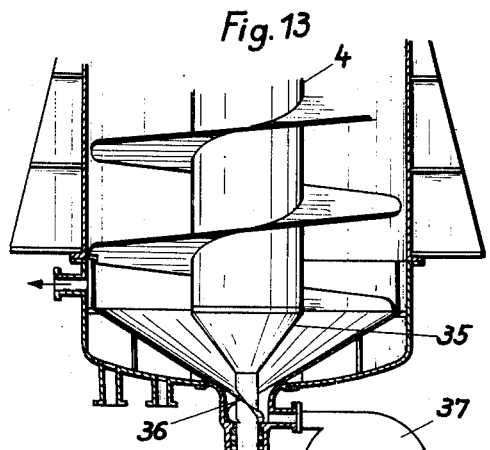
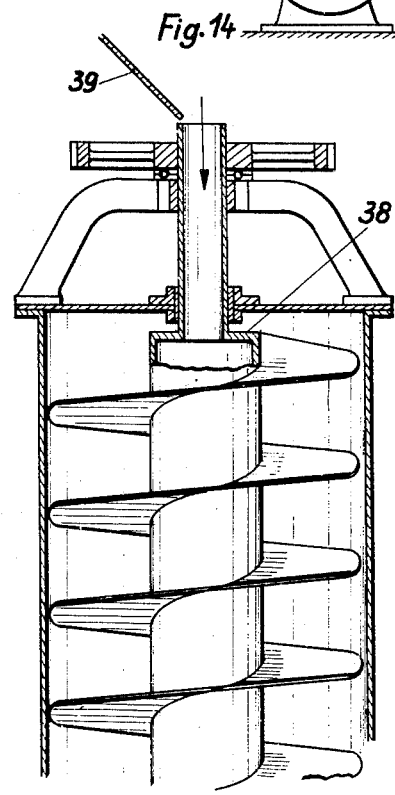
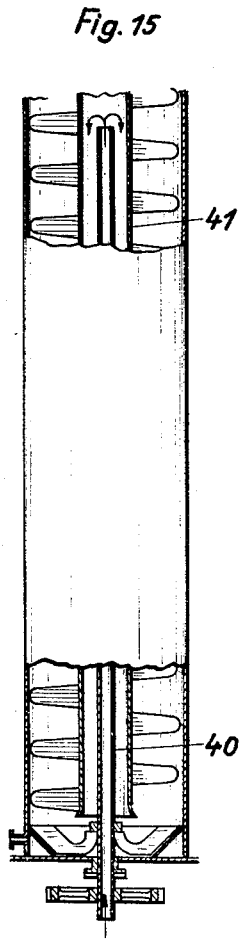

Patented May 5, 1953

2,637,666

UNITED STATES PATENT OFFICE 2,637,666

EXTRACTION TOWER FOR COMMINUTED MATERIAL OF VEGETABLE OR PLANT ORIGIN, PARTICULARLY SUGAR BEETS

Eugen Langen, Elsdorf, Germany

Application January 31, 1950, Serial No. 141,384
In Germany July 1, 1949

14 Claims. (Cl. 127—7)

The invention relates to an extraction tower for comminuted material of vegetable or plant origin, particularly sugar beets.

The tower is of a construction to secure an exceedingly uniform feed of the material under treatment throughout the total cross-section of the tower, thereby avoiding the deleterious inclusion of air in the mass.

In the tower constructed according to the invention the extracting operation instead of being similar to that in continuously operating installations such as heretofore known is analogous to the continuous operation in a diffusion battery and having as an essential feature of advantage the extraordinarily simple construction, involving only one half the materials heretofore used and so reducing the costs of construction while also requiring only a single main drive.

Furthermore this continuously operating apparatus for the first time makes it possible to treat raw materials, e. g., cold shreds of vegetables, directly in the apparatus with heat provided by suitable means located in the mechanism. In contrast thereto, previous mechanisms for continuous operation for a like purpose required complicated heating apparatus for pre-heating the shredded materials in order to supply the apparatus with material at the temperature necessary for the extracting process.

The invention consists in providing an extraction tower having an upper inlet for fresh water and a lower outlet for the extracted juice and enclosing an extraction worm which occupies the cross-section of the tower and serves to feed the material upwardly, the diameter of the worm shaft being about one third of tower diameter and the worm on the shaft having a pitch of 1:3 at the most.

The worm shaft preferably is in the form of a central tube having a closed lower end, which may be conical and over which the material is directly introduced into the extraction compartment containing the said worm. The tube may also be used as a compartment for pre-treating the material which for the purpose of prolonging the path of diffusion is supplied to the tube either from above or from below.

In addition, it is also advantageous to arrange in the central tube a spiral feeding-in conveyor or worm which feeds the material downwardly and the lower end of which through suitable reversing means is in communication with the lower end of the extraction worm which feeds the material upwardly.

It is particularly desirable to use the central tube as an axle on which the extraction conveyor or worm revolves and to provide a drive at the upper end of said conveyor above the top of the tower, whereas the feeding-in conveyor revolves about its own axis and is provided with a separate drive connected to its lower end which projects below the tower. This latter construction has the advantage that the speed of rotation of the feeding-in conveyor for raw material may be regulated according to circumstances, and thus it may be used as a measuring spiral for the raw material.

It is desirable also to interrupt the spiral at intervals, to thus provide radial abutments that overlap each other like roof tiles with a gap of some 10 mm. at the points of overlapping for the passage therethrough of the raw juice. Thus the path of the juice can be shortened and also the flow resistance and there can be provided stationary retarders for slowing the flow of shredded material at the interruptions of the spiral.

Finally the drive for the new construction can be made reliable and in correspondence with the operation of the device, by providing a throttle valve in the juice outlet pipe, with a float that is operated by the level of the juice in the tower and controls the throttle valve.

Other advantages will suggest themselves as a result of the reading of the subtended description and the annexed drawings which are made a part of this application and in which similar reference characters indicate similar parts.

Referring now to the drawings,

Fig. 1 shows an extraction tower according to the invention partly in elevation and partly in section, Fig. 2 is a section, on a larger scale, of the lower end of the tower with the spindle of the feeding-in worm being hollow at least down to the pre-mash zone, Figs. 3 and 4 show a modified form of extraction worm in a plan view and in a longitudinal section, respectively, Figs. 5, 6 and 7 are elevations and plan views, respectively of other forms of the extraction worm, Fig. 8 is a longitudinal section of an extraction tower comprising an extraction worm the diameter of which gradually increases towards its discharge end, Fig. 9 is a similar section of a tower with a worm the pitch of which decreases in steps toward the discharge end of the worm, Fig. 10 shows the upper end of a tower with a reduced inlet for the mass of shreds to be pumped into the tower.

Fig. 11 is a partial longitudinal section of an extraction tower with which the pumping-in of the shreds takes place from below, Fig. 12 is a section of an embodiment in which the extraction worm and the feeding-in worm are mounted on a common carrier, Fig. 13 is a sectional view of the lower end of a tower to which the shreds are supplied from below, Fig. 14 is a sectional view of the upper end of an embodiment with which the shreds are supplied from above, and Fig. 15 shows an embodiment of a tower, partly in section and partly in elevation, with a hollow supply pipe extending from below into the central tube carrying the extraction worm.

In the drawings, reference character 1 indicates a sieve on a primary conveyor 2, which feeds material to the upper end of a tube 4 that is located centrally of an extraction tower 3. This tube carries a driving gear 5 at its upper end which extends above the tower. A spiral downwardly feeding conveyor 6 rotates inside the tube and feeds material downwardly therein, the shaft 7 of said conveyor projecting from the lower portion of tower 3 and carrying a gear 8 at its lower end. The central tube serves as a rotary hollow spindle for the rotary extraction spiral 9 the tube and extraction spiral filling the tower, in a transverse direction. The diameter of the central tube 4 is about one third of the tower diameter and the pitch of the conveyor spiral 9 is about 1:3. With these proportions a substantially square feed section is formed between two successive worm windings on the one hand and the tower and worm shaft on the other hand.

A conically widening sheet metal feed reversing guide 10 extends from the lower end of the central tube which terminates close to the bottom of the tower. Said guide extends outwardly and downwardly and then further in the form of a conically expanding sieve 11 to the extraction conveyor 9. Movably arranged in the annular space defined by the parts 10, 11 are radial wing-like distributors 12, which are shaped according to the sectional shape of the said annular space.

The upper part of the extraction tower bears a connection 13 for supplying fresh water to the interior of the tower and at a lower point there is a connection 14 for supplying water under pressure to the tower. At the lower end of the tower there is a pipe 15 for drawing off the raw juice. This pipe may contain a throttle valve 16 controlled by a float 17 which is governed by the level of the juice in the tower. In the upper part of the tower there are also spiral conveyors 18 for withdrawing exhausted material from the tower.

The material to be extracted, which may consist for example of shredded sugar beets, is fed into the central tube 4 of the tower by means of the sieve 1 and the conveyor 2. From the inlet of the tube 4 the material is acted on by the conveyor 6 and is moved downward in the tube 4. In the course of its travel the material is compressed and is finally fed to the transferring means 10, 11, which feeds it to the elevating conveyor, it being acted upon by the distributing means 12 on the way to conveyor 9. The conveyor carries the material upward against the flow of the downwardly traveling extraction liquid and indeed this is done in an ideal manner in that as the leached material travels upward and is progressively leached out it encounters liquid that is progressively less thoroughly saturated with the sugar or other soluble material that is held in solution in the said liquid. In this manner the completely lixiviated material finally reaches the conveyors 18 that discharge it from the tower. The fully saturated liquid on the contrary leaves the tower by way of exit passage or pipe 15, and if the throttle valve is employed it is discharged in quantity governed by the resistance due to the weight of the accumulating mass of shreds in the tower.

As shown in Fig. 1, the lower end of the tower may be provided with supply pipes 19 for a heating medium, thus making it possible to arrange for preheating the material to a desired temperature even before the leaching operation has begun.

According to Fig. 2, the shaft 7 of the feeding-in conveyor is made hollow at least to the premash zone and is there provided with outlet ports 20 whereas its lower end is connected by means of a pipe 21 to the outlet passage 15 of tower 3 for drawing off the raw juice. Arranged in the central tube 4 in spaced relation thereto is a cylindrical sieve 22 extending about one meter above the level of the ports 20. The central tube below the upper level of the juice is formed as a double-walled cylinder 23 to permit entry of a heating medium between said walls.

In this manner it is provided that the downwardly traveling material, even before reaching the extraction conveyor, may come into intimate contact with the lixiviating fluid, so that the mashing will begin at this point. The juice passes through the passage 21 into the hollow shaft 7 and from this hollow shaft through the ports 20, 20, into the space at the lower end of the tube 4 about the feeding-in conveyor. The action taking place here may be heightened by introducing fluid heating medium, e. g., steam or hot air, between the double walls 23. Residual air in the mass of shreds escapes in upward direction by way of the sieve mantle 22.

As shown in Figs. 3 and 4 the worm 9 may be interrupted at intervals for from a ½ turn to a ⅔ turn and in such a manner that the abutments or thrust edges 9a thus formed overlap one another. At these interruptions there are placed fixed retarders 24 projecting into the path of the moving material under treatment. These retarders hold back the material to insure uniform movement thereof, whereas the interruptions in the worm shorten the path of the juice and reduce the resistance to movement of the juice. This construction has the particular advantage that by it the very costly manufacture of a continuous worm can be dispensed with. The small worm segments require only little forming work.

Fig. 5 illustrates part of an extraction worm composed of a plurality of segment-shaped parts 9'. These segments overlap one another like roof-tiles, leaving between each other passage gaps 9'' for the raw juice of some 10 mm. in height.

The extraction worm shown in Fig. 6 has ports 25 for the passage therethrough of the juice. These ports are covered at their upper and/or lower sides by deflecting flaps 26 which lead the material over and prevent clogging of the ports.

The sectional elevation and plan view according to Fig. 7 show an extraction tower having retarders 27 which extend up to the worm shaft 4. The worm has interruptions 28 which in the rotation of the worm allow the passage of the retarders 27. The interruptions 28 are bridged by movable flaps 29, which are normally held in closed position by the action of plate springs 30. The flaps on striking against the retarders 27 give way, but otherwise prevent the material under treatment from falling back through the interruptions.

Another improvement in the construction consists in reducing the cross section of the pressure space progressively in harmony with the decreasing volume of the traveling mass of shreds as they are moved upward by the extraction worm and increasingly leached out. This can be done either by decreasing the pitch of the spiral conveyor toward its upper end or by making the cross section of the shaft of the extraction conveyor of increasing cross section toward its outlet, such as shown for example in Fig. 8. It may be of advantage in construction neither to lower the pitch of the conveyor in continuous manner nor to increase the cross section of the central carrier continuously, but rather to make these changes step-by-step. An embodiment of a tower with an extraction worm 9 having a pitch decreased in steps is shown by Fig. 9.

The shredded materials may be supplied to the extraction tower by other means than a spiral conveyor, as by means of a pump. If a pump is used the central tube 4, as in Fig. 9, can be made double-walled and the inner wall can be provided at the height of about one to two meters above the juice level of the outer extraction space with apertures 31 and with drainage passages at the lower end of the tube, as at 32, for the pumped liquid.

This liquid then passes across through the mass of shreds to the conical sieve 11 and thence outward in the usual way through the outlet passage 15 for the raw juice. In such case the shreds need not be mashed and the shaft 7 can be made solid. With this form of the invention the feeding-in conveyor 6 need no longer extend to the inlet end but it is sufficient that said conveyor extend to the discharge conveyors 18. Then it is further desirable to substitute a tube of smaller diameter at the top of tube 4 above conveyors 18 (Fig. 10) and thereby facilitate the mounting of the upper drive gear 5 of the central tube 4.

By adopting the two last-mentioned expedients the shaft 7 of the feeding-in conveyor 6 may be solid, and there is also the further possibility that this shaft, as shown in Fig. 11, can be formed as a hollow shaft and used to receive the fluent shredded material from below. The fluent material is then discharged into the central tube 4 through openings 33 of the hollow shaft 7 above the juice level in the actual extraction space. This form of the invention has the advantage that extraction of sugar begins immediately upon introduction of the shredded material.

With the modified form shown in Fig. 12 the central tube 4 constitutes the shaft for both worms 6 and 9, which then have turns extending in opposite directions.

As illustrated in Fig. 13, the worm shaft may be formed by a tube 4 having a cone-shaped lower end 35. Such construction allows of introducing the material into the extraction tower from below by directing it against the cone 35, feeding it in under pressure by means of a pump 37 and a spiral 36.

As an alternative, the material to be treated may also be fed from above to a tube 38, for example, over a chute 39 as in Fig. 14. This central tube 38 then forms a pre-treating space, due to which the time which the material remains under the influence of the extraction liquid is appreciably prolonged.

Finally, Fig. 15 shows the possibility of feeding the material under pressure from below through a pumping pipe 40 into a central tube 41, which construction likewise provides for a long time of treatment of the material.

Extraction can be carried on in the new construction not only with water but also with volatile fluid solvents, e. g., such as benzine, which is particularly useful in the case of oil-containing plant material. In such cases the supplying and drainage means for water and raw juice such as illustrated in the drawings serve to supply the volatile solvent and to carry off the juice leached out of the shredded material, including the oil, sugar or whatever is to be recovered from such material.

Having thus fully described my invention, what I claim is:

1. In an extraction tower for treating comminuted vegetable material, said tower having an upper inlet passage for water, a lower outlet passage for extracted juice, and an elevating spiral in the tower of a diameter equal to that of the interior of the tower, the combination of a tubular shaft serving as the shaft of the elevating spiral, a spiral in said tubular shaft for feeding said material downward, reversing means for directing the current of material from the bottom of said tubular shaft to the elevating spiral, said elevating spiral being interrupted at intervals, fixed abutments extending into the interruptions for retarding said material, and means for removing exhausted material.

2. A device as in claim 1 wherein the diameter of said shaft is about ⅓ that of the tower, and the pitch of the elevating spiral is not greater than 1:3.

3. A device as in claim 1, wherein said tubular shaft projects above said tower and a shaft for the feeding-in spiral projects below said tower, and driving means for said tubular shaft and said feeding-in conveyor shaft, said driving means being located respectively on the projecting ends.

4. A device as in claim 1, wherein said feeding-in spiral includes a shaft that is hollow at its lower end approximately to the level of the liquid in the tower, ports in said bottom shaft at said level, and a passage from said ports to the outlet from the tower.

5. A device as in claim 4, including a tubular screen about said tubular shaft at the level of said ports and extending upward from said level.

6. A device as in claim 1, wherein the tubular shaft is formed as a double mantle adjacent the liquid level for application of heat to the material under treatment.

7. A device as in claim 1, including means for admission of a heating medium to the inside of the tower, said means being above the point of reversal of the current.

8. A device as in claim 1, wherein the reversing means includes a cone flaring downward and outward from the axis of the feeding-in spiral, said cone merging into a conical screen that flares outward toward the extraction spiral.

9. A device as in claim 1, wherein the blade of the extraction spiral consists of segments overlapping each other and having spaces between them at the points of overlap for escape of liquid.

10. A device as in claim 1, including a throttle valve in the outlet passage, and a float in the tower connected to said valve for controlling it in accordance with the level of liquid in the tower.

11. A device as in claim 1, wherein the tubular shaft is formed as a double wall and is connected at its upper end to a pump for disintegrated vegetable material, the inner wall having inlet ports for liquid through the inner wall above the liquid level in the extraction chamber of the tower, and outlet ports for said liquid at the lower end of the double wall.

12. A device as in claim 1 wherein the extracting conveyor comprises a spiral blade, a tube about which said blade is secured, said tube having a conical end, and a pump for forcing material to be treated into the space about said conical end into the extraction space about said conveyor.

13. A device as in claim 1, wherein the blade of the extraction conveyor is interrupted at intervals to expedite passage of liquid, and fixed retarders on the inner wall of the tower, said retarders extending into the interruptions of said blade.

14. A device as in claim 1, wherein the blade of the extraction spiral has ports for passage of liquid; and deflectors each being mounted at one side of a port and extending across said port in the direction of flow of material past said port.

EUGEN LANGEN.

References Cited in the file of this patent

UNITED STATES PATENTS

| Number | Name | Date |
|---|---|---|
| 137,746 | Wilkinson | Apr. 8, 1873 |
| 755,546 | Rak | Mar. 22, 1904 |
| 780,819 | Schwarz | Jan. 24, 1905 |
| 962,725 | Stewart | June 28, 1910 |
| 1,189,502 | Stewart | July 4, 1916 |
| 2,043,409 | Heitmann | June 9, 1936 |
| 2,183,837 | Hamilton | Dec. 19, 1939 |
| 2,426,677 | Fulmer | Sept. 2, 1947 |

FOREIGN PATENTS

| Number | Country | Date |
|---|---|---|
| 1,931 | Great Britain | of 1887 |
| 85,140 | France | Apr. 3, 1869 |
| 102,675 | France | Mar. 17, 1874 |
| 109,735 | France | Sept. 2, 1875 |
| 533,896 | France | Dec. 22, 1921 |
| 669,053 | France | July 27, 1929 |